(12) United States Patent
Liesener et al.

(10) Patent No.: US 11,472,290 B2
(45) Date of Patent: Oct. 18, 2022

(54) VEHICLE ARRANGEMENT, VEHICLE AND METHOD FOR PROVIDING A DISPLAY

(71) Applicant: SMR Patents S.à.r.l., Luxembourg (LU)

(72) Inventors: Alf Liesener, Bruchköbel (DE); Stefanie Göttlicher, Bruchköbel (DE); Christian Schär, Esslingen (DE); Maximilian Kauffmann, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 44 days.

(21) Appl. No.: 16/750,383

(22) Filed: Jan. 23, 2020

(65) Prior Publication Data

US 2020/0233216 A1  Jul. 23, 2020

Related U.S. Application Data

(63) Continuation-in-part of application No. PCT/EP2018/069801, filed on Jul. 20, 2018.

(30) Foreign Application Priority Data

Jul. 24, 2017  (DE) ................ 10 2017 116 699.8

(51) Int. Cl.
*B60K 35/00* (2006.01)
*G02B 27/01* (2006.01)
(Continued)

(52) U.S. Cl.
CPC .............. *B60K 35/00* (2013.01); *B60R 1/12* (2013.01); *G02B 27/0149* (2013.01);
(Continued)

(58) Field of Classification Search
CPC .............. B60K 35/00; B60K 2370/149; B60K 2370/152; B60K 2370/37; B60K 2370/67;
(Continued)

(56) References Cited

U.S. PATENT DOCUMENTS 6,448,893 B1 * 9/2002 Dobberkau ............ B60K 35/00
340/461
2005/0057351 A1 * 3/2005 Adams .................. B60K 37/02
340/461
(Continued)

FOREIGN PATENT DOCUMENTS

DE     102014221091 B3    3/2016
DE     102014221091 B3 *  3/2016  ............ B60K 35/00
(Continued)

OTHER PUBLICATIONS

International Search Report dated Oct. 19, 2018 of International application No. PCT/EP2018/069801.
(Continued)

*Primary Examiner* — Christopher S Kelley
*Assistant Examiner* — Kathleen M Walsh
(74) *Attorney, Agent, or Firm* — Jones Day (57) ABSTRACT

A vehicle arrangement includes a display device for displaying at least one item of information on a display surface for at least one person being transported by the vehicle, a detection device for detecting disturbance of the view of the person of the display surface, and a further component which is compensating the detected disturbance of the view of the person of the display surface at least partially by at least one of movement relative to the display surface and alteration of its external shape. A vehicle includes at least one such vehicle arrangement, and a method provides a display in or on a vehicle.

16 Claims, 6 Drawing Sheets

(51) Int. Cl.
*G06F 3/14* (2006.01)
*H04N 5/247* (2006.01)
*B60J 3/02* (2006.01)
*B60R 1/12* (2006.01)
*B60J 1/20* (2006.01)
*B60R 11/04* (2006.01)
*B60R 11/00* (2006.01)

(52) U.S. Cl.
CPC ....... *G02B 27/0179* (2013.01); *G06F 3/1423* (2013.01); *H04N 5/247* (2013.01); *B60J 1/2013* (2013.01); *B60J 3/02* (2013.01); *B60K 2370/149* (2019.05); *B60K 2370/152* (2019.05); *B60K 2370/1529* (2019.05); *B60K 2370/166* (2019.05); *B60K 2370/167* (2019.05); *B60K 2370/52* (2019.05); *B60K 2370/67* (2019.05); *B60K 2370/73* (2019.05); *B60R 11/04* (2013.01); *B60R 2001/1253* (2013.01); *B60R 2011/0012* (2013.01); *B60R 2011/0033* (2013.01); *G02B 2027/0159* (2013.01); *G02B 2027/0187* (2013.01)

(58) Field of Classification Search
CPC .......... B60K 2370/73; B60K 2370/736; B60K 37/00; B60K 37/04; B60K 37/06; B60K 2370/1529; B60K 2370/166; B60K 2370/167; B60K 2370/52; B60R 11/04; B60R 1/12; B60R 2001/1253; B60R 2011/0012; B60R 2011/0033; G02B 2027/012; G02B 2027/0159; G02B 2027/0187; G02B 27/0093; G02B 27/0101; G02B 27/0149; G02B 27/0179; G06F 3/1423; H04N 5/247; B60J 1/2013; B60J 3/02
USPC .......................................................... 348/78
See application file for complete search history.

(56) References Cited

U.S. PATENT DOCUMENTS

| | | | | |
|---|---|---|---|---|
| 2014/0039730 | A1* | 2/2014 | Loubiere | B60R 99/00 |
| | | | | 701/3 |
| 2017/0013188 | A1* | 1/2017 | Kothari | B60R 1/00 |
| 2019/0255919 | A1* | 8/2019 | Kishimoto | B60J 3/00 |

FOREIGN PATENT DOCUMENTS

| | | | | |
|---|---|---|---|---|
| DE | 102015016649 A1 * | 7/2016 | | B60K 35/00 |
| DE | 102015016649 A1 | 7/2016 | | |
| JP | H0574966 | 3/1993 | | |
| JP | H0574966 A | 3/1993 | | |
| JP | H0574966 U * | 10/1993 | | B60K 35/00 |
| WO | WO 2003/082621 A1 | 10/2003 | | |
| WO | WO-2016133146 A1 * | 8/2016 | | G01D 7/00 |
| WO | WO 2019/020526 A1 | 1/2019 | | |

OTHER PUBLICATIONS

Written Opinion dated Oct. 19, 2018 of International application No. PCT/EP2018/069801.
Combined Search and Examination Report under Sections 17 & 18(3) dated May 10, 2021 of GB Application No. GB2020594.4.

\* cited by examiner

VEHICLE ARRANGEMENT, VEHICLE AND METHOD FOR PROVIDING A DISPLAY

CROSS-REFERENCE TO RELATED APPLICATIONS

This application is a continuation-in-part of International Patent Application PCT/EP2018/069801, filed Jul. 20, 2018, which claims the benefit of foreign priority to German Patent Application No. DE 10 2017 116 699.8, filed Jul. 24, 2017, each of which is hereby incorporated by reference in its entirety for all purposes.

BACKGROUND

1. Field of the Invention

The present disclosure relates to a vehicle arrangement, a vehicle with such a vehicle arrangement and a method for providing a display, in particular with such a vehicle arrangement.

2. Related Art

Different procedures have been proposed in the automotive sector to avoid glare effects. For example, DE 10 2012 201 322 A1 concerns a method for driving a display device for outputting an image in an interior of a vehicle, the vehicle having at least one vehicle camera. The method involves determining a glare characteristic based on an image information from a camera of the vehicle, where the glare characteristic is caused by a glaring light source arranged outside the passenger compartment. The glare avoiding parameter of an activation signal for the display unit is generated in response to the glare characteristic. The glare avoiding parameter is formed to generate an optical effect in the image area of the display unit. This method is very computationally intensive.

DE 10 2012 022 322 A1 describes a method for adjusting a flat screen monitor or panel of a motor vehicle. The method involves receiving position information of a vehicle through a satellite-based global positioning system. The date and time information of a global time zone is received. The direction of travel information is calculated from chronological position information of the system. The information is evaluated based on calculation of a spatial sunlight direction on the flat panel within the vehicle. The display is automatically adjusted about a transverse axis to direct or diffuse through the flat reflected solar light beams that do not hit face of a driver.

DE 10 2016 009 989 A1 also describes a method for adjusting the angle of a display to reduce reflections. When the entire display is adjusted, the information displayed becomes more difficult for the target person (especially the driver) to grasp, even if the reflection itself is only visible on a small part of the display.

JP 2006-335182 A reveals a positionally variable sunlight beam shielding hood installed on a display screen of a vehicle equipment, wherein a shielding area can be adjusted to the sunlight on the display screen. With the position-variable sunlight beam shielding hood, a sunlight beam sensor is arranged on the display screen to detect the sunlight in order to ensure the minimum required shielding area of the sunlight beam shielding hood without obstructing the visibility of the display by reflecting sunlight.

JP H05 74966 U provides a sunshade cover for a display device, comprising a slide mechanism provided on the outer periphery of the screen of the display device and having a variable feeding amount to the front of the screen.

DE 10 2015 016 649 A1 relates to a method for automatically setting an anti-reflective surface of a display in a vehicle, in which the position of the display is adjusted as a function of an eye position of a vehicle occupant. In a method in which glare to the vehicle occupants is reliably prevented by the display, in addition to the eye position, a position and/or position of the vehicle and a position of the sun are recorded and geometrically calculated, with which combination of these parameters glare of the vehicle occupants occurs the display occurs, with the position being automatically adjusted immediately before a combination of the parameters causing the glare occurs.

DE 10 2016 001 351 A1 reveals a shading device for an instrument cluster of a motor vehicle, the shading device being designed for mounting on the instrument panel of the motor vehicle and comprising a shading surface, the shading surface being designed to be variable in its extent. It further reveals a system comprising such a shading device, the system further comprising at least one light-sensitive sensor and a control device coupled to the at least one light-sensitive sensor, the control device being adapted to control the extension of the shading area in dependence on the signal received by the at least one light-sensitive sensor.

EP 1 400 392 A2 reveals a sun visor for a vehicle console comprising an instrument panel, a guide extending along the console, and an anti-glare screen slidably mounted on the guide to be moved along the guide to a selected position to provide protection against incident light from a particular direction, the anti-glare screen reducing incident light on the instrument panel.

A plate-shaped display device according to DE 10 2005 035 645 A1 is partitioned into a meter display area and a head-up (HUD) display area. Images displayed on the display device are visible on both front and rear surfaces of the display device. A direct image displayed on the meter display area is projected toward an eye range of a vehicle driver. A reflected image displayed on the HUD display area is firstly projected in a direction opposite to the eye range. Then, the reflected image is reflected at a magnifying mirror and a windshield, then finally projected toward the eye range.

DE 102 14 200 C1 and WO 03/082621 A1 relate to a combined instrument that comprises display devices for installation in a motor vehicle, and a drive device with which the position of the display devices relative the vehicle can be modified so as to allow for glare-free reading. The position of the display devices is modified automatically by an installed electronic circuit that controls the drive device subject to defined parameters. Said parameters may be measuring values of light sensors and/or motion sensors mounted on the vehicle and/or values that are determined by an evaluation unit using a database.

There is a need to eliminate disturbing reflections of a display surface, in particular comprising a mirror surface, for a person moving with a vehicle. This is mainly aimed at the driver of the vehicle, but can also be used for other persons (passengers), such as the front passenger.

In addition there is the need to eliminate disturbance due to unintentional movement of the eliminate disturbing, in particular due to wind, either encountered outside the vehicle or entering into the vehicle.

In addition to motor vehicles, motorcycles or bicycles, aircraft or watercraft can also be considered as vehicles, as can wheelchairs, scooters or similar.

It is the object to provide a vehicle arrangement so that at least the driver is protected from disturbance like glare caused by reflections and/or misalignment caused by wind.

The object is achieved by a vehicle arrangement comprising a display device for displaying at least one item of information on a display surface for at least one person being transported by the vehicle, a detection device for detecting disturbance of the view of the person of the display surface, and a further component which is compensating the detected disturbance of the view of the person of the display surface at least partially by at least one of movement relative to the display surface and alteration of its external shape.

Embodiments can be characterized in that the detection device comprises at least one first camera for detecting glare of the person by the display surface, wherein the at least one first camera is arranged in the vehicle, preferably in the vicinity of a head of the driver of the vehicle, such that it directly detects light beams reflected from the display surface, and a control device is connected to the detection device for driving the further component for at least one of projecting beyond or above at least a region of the display surface and moving, in particular rotating, the display surface in such a way that the person is protected from glare by light beams reflected directly and/or diffusely by the display surface.

Further embodiments can be characterized in that the vehicle arrangement is comprised by a dash board assembly or a rear view device, in particular an internal or an external rear view device, or the display surface is located inside the vehicle, preferably on the door close to the A-column, or the display surface comprises a mirror surface.

Further embodiments can be characterized in that the further component forms at least one section of an upper cover, or the further component can be moved at least partly over the display surface, preferably the movement being at least one of a sliding and pivoting, or the further component comprises at least one of an unrollable blind and foldable visor.

Further embodiments can be characterized in that the further component, when moving or changing its outer shape or both, releases a further display device which provides an alternative or additional display for at least part of the information, wherein the further display device is connected at least to the control device.

The further display device can be comprises by a head-up display.

Embodiments can be characterized in that the display surface is suited to be moved at least one of translationally and rotationally, or the further component comprises at least one actuator or at least one drive device.

Further embodiments can be characterized in that the further component comprises at least one compensatory means for compensating at least one of a relative movement and alteration of external shape to display the complete information, selected from a mechanical compensation means, an electronic compensation means, or an additional display, in particular provided by the additional display device.

Further embodiments can be characterized in that the detection device is suited to detect the direction of gaze of the person, or the detection device comprises at least one of a light sensor, a camera, an infrared camera, an iris recognition device, an eye tracking device and a polarization filter, behind which at least one light sensor or a camera is arranged, or the detection device comprises a position sensor, or the detection device comprises a wind sensor or an air circulation sensor, or the detection device comprises a plurality of sensors arranged around the display surface.

Embodiments can be characterized in that the first camera comprises a polarizing filter, or the first camera is embedded in the driver's seat, or the first camera is integrated into a mobile device, in particular into a wearable like eye glasses Further embodiments can be characterized in that the detection device comprises at least one of a second camera for recording the driver's face, in particular his/her eyes, and at least one of a third camera, a light sensor, a position sensor, a wind sensor and air circulation sensor arranged next to the display surface.

Embodiments can be characterized in that the detection device receives information on at least one of the position or change of position of the display surface, in particular relative to at least one of a dashboard assembly, a windshield, a door, a window, an A pillar and a driver's seat.

Thus, the vehicle arrangement according to the application has a display device for displaying information on a display surface. The display surface can be part of a display component and/or can be provided by a mirror surface and/or an OLED. In case of display devices works on the principle of projection (head-up display) or uses holographic methods, the actual display surface can be located outside the display device itself. The vehicle arrangement has a further component provided outside the display surface, preferably completely different from the display device, especially if the display surface is provided by a component of the display device.

According to one embodiment the display surface can be made concealable in at least a partial area by the further component by a relative movement between the display surface and the further component, and/or by a change in the outer shape of the further component, such as by an unfolding and/or by a change in size of the further component, in order to protect a person to be transported by the vehicle from being dazzled by the concealed partial area. Thus, a mechanical blockage occurs by providing a protective screen in the light path between the display surface and the otherwise dazzled person. If only a small part of the display area is covered, the person can still absorb most or all of the information displayed.

It is further proposed that the vehicle arrangement is comprised of a dashboard arrangement or a rear view device. In particular with the display device being integrated into the dashboard, the further component can form at least one section of an upper cover, which can be moved over the display surface and/or swiveled over it. Since glare is mainly caused by the sun, i.e. from above, this relocation of the top cover over the display surface is a particularly easy to implement design. Glare can also be caused by front head lamps of other vehicles, which might be compensated by rotation of the display surface.

The vehicle arrangement may also be applied to a display device integrated in or mounted on a rear view device of the vehicle. The risk of glare from the sun is particularly high in the case of a rear view device outside the passenger compartment (external rear view device), whereas the risk of glare from front head lamps of other vehicles is particularly high in the case of a rear view device inside the passenger compartment (internal rear view device). The further component can be arranged in or on the rear view device in one embodiment. Due to the proximity to the display surface, dimming can then be done quickly and easily. In another embodiment, the display area on the rear view device outside a passenger compartment (when the vehicle is essentially closed) is dimmed by another component inside the passenger compartment. This protects the rest of the component from the effects of the weather.

The further component can provide at least a section of an upper cover, and/or the further component can be extended over the display surface and/or pivoted over it, and/or the further component can comprises an unrollable blind and/or a foldable visor.

In an embodiment, the further component can comprise an unrollable blind in form of a cloth which can be rolled up and unrolled again, or a chain of link plates which are coupled together by means of joints, or the like. In the same way, a foldable and collapsible umbrella can also provide the further component or be part of it.

The further component, when moving and/or changing its outer shape, can release a further display device which provides an alternative or additional display of at least part of the information.

In order to ensure the display of the information, the other display device may be used to display the information or parts of it in a supplementary or redundant manner. Preferably, this additional display device is released for this purpose during movement to avoid glare and/or by the further component during changes in its external shape (unfolding, resizing), i.e. it is otherwise inactive. For example, a head-up display can replace a screen display when a top cover of a dashboard is moved and/or rotated.

The display surface can be moved by translation and/or rotation.

Movability of the further component can be combined with a translatory and/or rotatory movability of the display surface.

According to further embodiments, the least one compensating measure provided by the further component can serve to compensate a relative movement due to wind passing the vehicle component, in particular the display surface.

For any movement and/or change of the outer shape for the purpose of displaying the complete information on the display surface, a mechanical compensation, as by a corresponding counter movement, an electronic compensation as by a change of the image, in particular change of the brightness, the contrasts and/or the colors, and/or by reduction, displacement, compression, and/or rotation of the display area of the display surface, and/or a supplementary display, in particular via the further display device, can be realized.

Such a compensatory measure by relative movement, which nevertheless allows to display the complete information to the person, can be carried out by means of a mechanical coupling. For example, if one part moves in one direction, another part may move in the opposite direction. Alternatively, a supplementary display is also possible by control commands from a control device. If, for example, a partial area of the display surface is covered by a blind, the display can be shifted to the remaining, uncovered partial area, possibly displayed smaller and/or compressed, or shifted partially or completely beyond the other partial area, or even provided at a completely different location. It is possible to shift the information from a display surface provided on a dashboard to another display device provided on a rear view device and vice versa.

The detection device for detecting a glare of the person by the display surface can also be set up to detect the direction of the person's gaze, and/or the control device, the further display device and/or at least one drive device can be connected or connectable. This means that the person (such as the driver) does not have to actively intervene, but is automatically protected from glare by the vehicle's equipment.

It is suggested that the detection device is set up to detect the direction of the person's gaze, and/or the detection device comprises at least one optical camera, an infrared camera, an iris recognition device and/or an eye-tracking device, and/or the detection device comprises a plurality of sensors arranged around the display area. The detection device may comprise at least one polarisation filter, behind which at least one sensor and/or at least one camera is arranged. A simple light sensor may also be used a detection device.

Preferably a (CCD, charge-coupled device) camera behind a polarization filter is used. Sensors around the display surface can detect directional light beams. The reflected light can be at least partially filtered out by a polarization filter.

Furthermore, the detection device can be used to detect the direction of vision of the person, in particular of a driver of the vehicle, the detection device having an optical camera and/or an infrared camera and/or another eye-tracking device. Dimming is only helpful when the driver or other person is looking at the display from which the glare is produced.

It is also possible that the detection device detects the position and/or any position change of the display surface and/or wind striking the display surface in order to detect any misalignment to be compensated by the further component.

The present disclosure also provides a vehicle with at least one vehicle arrangement.

The control device controlling the further component can be provided by the vehicle control device.

The vehicle arrangement with its display surface can be provided by a rear view device, with the rear view device preferably comprising a mirror surface and/or a light sensor or a camera, or the vehicle arrangement with its display surface can be provided by a dashboard assembly, or at least two vehicle arrangements with two display surfaces can be provided, preferably one display surface being comprised by a dashboard assembly and another display surface being comprised by a rear view device.

The application also provides a method for providing a display in or on a vehicle by using a display device with a first display surface, with detecting whether at least one person being transported by the vehicle, preferably the driver of the vehicle, is disturbed by at least one of a reflection of light beams from a light source or a reflector on the first display surface or a relative movement of the first display surface, in particular due to the impact of wind or air circulation, comprising the steps of detecting a disturbance of the view of the person of the first display surface, and controlling a further component in case of detection of a disturbance, with control means connected to the detection device for at least one of relative movement between the first display surface and at least one of a dashboard assembly, a windshield, a door, a window, a driver's seat and the further component, deployment of the further component, altering the size or geometry of the further component, and shifting information from the first display surface to a separate second display surface.

Said relative movement, deployment and/or altering the size or geometry can lead to at least partially covering the display surface. "Covering" the display surface means that the further component comes somewhere between the display surface and the eye of the person, i.e. it prevents a direct beam path.

In addition, the method can be carried out by the vehicle arrangement described. The embodiments of the vehicle arrangement are thus all reflected in method aspects. In particular, a compensatory measure for relative movement and/or unfolding and/or resizing nevertheless enables the information to be displayed to a person, and preferably changes the allocation of the displayed information to sub-areas of the display area within the scope of the compensatory measure. Furthermore, another display device can released and/or activated by the other component. Also, alignment of the display surface can be achieved due to taking position changes resulting from wind impact in consideration when compensating disturbances.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
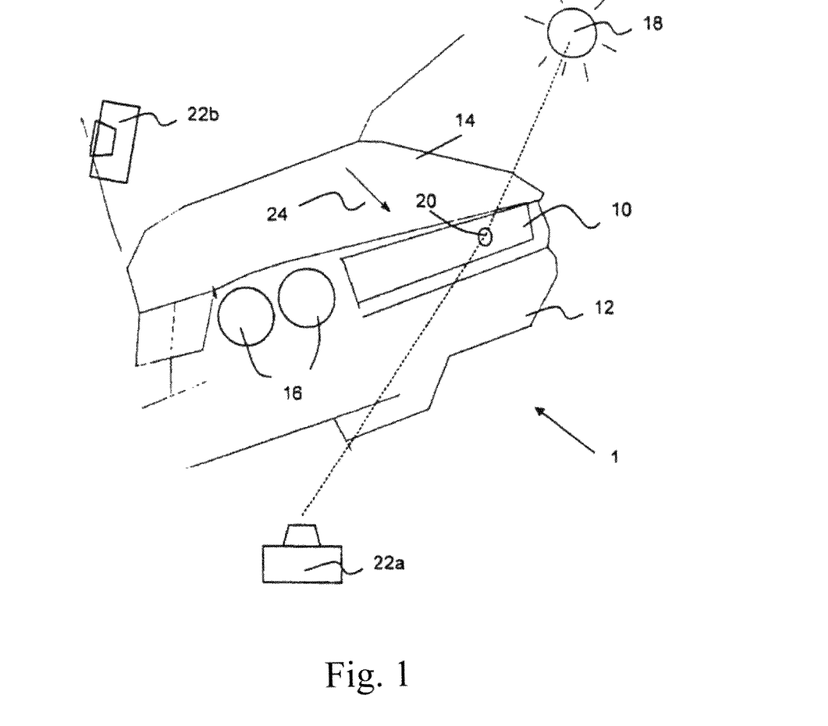
FIG. 1 shows a perspective view of a vehicle interior having a vehicle arrangement of a first embodiment provided by dashboard assembly.

A dashboard assembly of a vehicle is shown in FIG. 1 and designated as 1 in its entirety. It comprises an integrated display device with a display area 10, on which information can be displayed as in the form of a map of a navigation system. The dashboard assembly 1 further comprises a rigid lower part 12 and an upper part 14 which is movable relative to the rigid lower part 12 and the display area 10. Other display devices 16 such as for a speedometer and tachometer are also provided in the dashboard assembly 1 and are preferably fixed to the rigid lower part 12.

A driver of the vehicle (not shown) may be glared by light beams emanating from the sun 18, by these light beams impinging on a sub-surface 20 of the display surface 10 and being reflected to the driver's eye. The display surface 10 can also reflect light beams originating from head lamps of other vehicles, internal cabin lights, mobile devices and the like (not shown). Two cameras can be used to capture these beams, although one of them would be sufficient in principle. A first camera 22a directly captures the reflected light beams and sits in the vicinity of the driver's head, for example embedded in the driver's seat. The camera 22a may include a built-in polarizing filter. The second camera 22b records the driver's face and in particular his/her eyes and, in cooperation with an evaluation device, can detect whether the driver is glared by iris recognition and/or eye-tracking procedures, including gaze direction recognition procedures. A control device not shown in FIG. 1 is coupled as an evaluation device with the cameras 22a, 22b. It generates control commands in case of detection of glare of the driver, which are received by a non-displayed electric motor for movement of the upper part 14 according to arrow 24 to a predetermined end position or at least until the upper part 14 enters between the driver's eye and the partial surface 20, which can be detected by cameras 22a, 22b. The glare is thus prevented.

The display device can also adapt the information displayed, e.g. by displaying the map for navigation in the area of display area 10 still remaining viewable through the driver's eye, even with the screening achieved by the upper part 14. Thus, the adaption can be in form of providing the information in a reduced overall size and/or compressed in one direction.

FIGS. 2a to 2d illustrate different implantation alternatives of the mechanical design of the dashboard assembly 1 with an electric motor 26 for moving the upper part 14, whereby the electric motor 26 is arranged outside the upper part 14, but can also be mounted in or on it. It is part of a drive unit for the upper part 14. Instead of an electric motor, a mechanical manual adjustment is also possible.

Figures 2A, 2B, 2C:
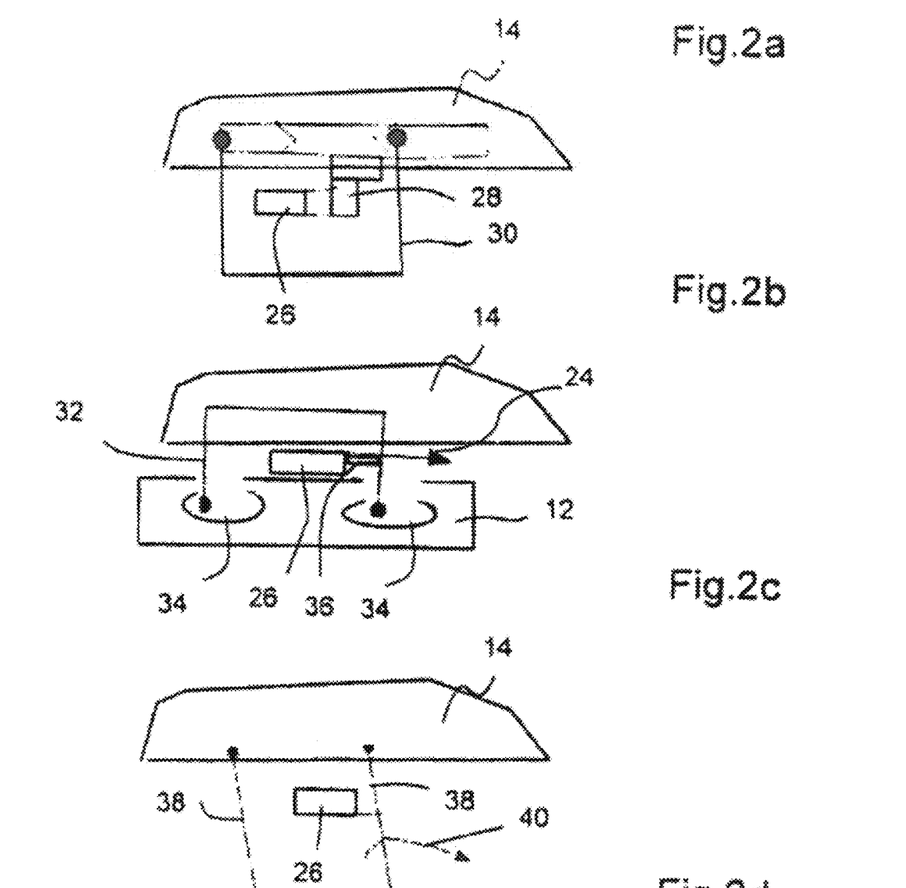
FIGS. 2a, 2b, 2c, and 2d each shows a partial sectional view through the dashboard assembly of FIG. 1 to illustrate different mechanical alternatives for moving an upper part of the dashboard assembly.

As shown in FIG. 2a, the electric motor 26 acts on an engagement lug 28 of a unit which is slidable within the upper part 14 until the unit acts on the upper part 14 via a U-shaped leg 30 to move the upper part 14.

As shown in FIG. 2b, two or more leg-shaped lugs 32 protrude from the upper part 14, the ends of which can be moved in one or more, in particular respective, guide seats 34. The electric motor 26 acts via a plunger 36 on at least one of the leg-shaped lugs 32 to move the upper part 14 in the direction of the arrow 24.

According to FIG. 2c, two or more lever arms 38 protrude from the upper part 14, in the lower part 12 (not shown). The electric motor 26 acts on at least one of the lever arms 38 to cause the upper part 14 to pivot relative to the lower part 12 as shown by arrow 40.

Figure 2D:
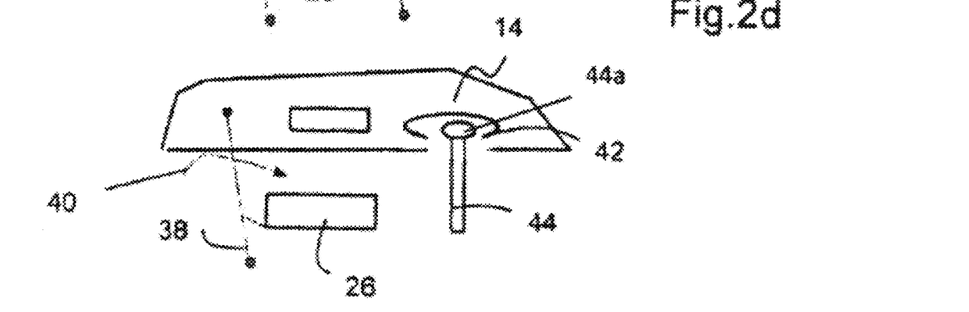

According to FIG. 2d, in modification of the alternative according to FIG. 2c, a lever arm 38 is replaced by a guide rod 44, which is movable with its head 44a in a guide seat 42 and fixed outside the upper part 14, for example in the lower part 12 (not shown). This means that the extent of pivoting is less than with the variant in FIG. 2c.

Figure 3:
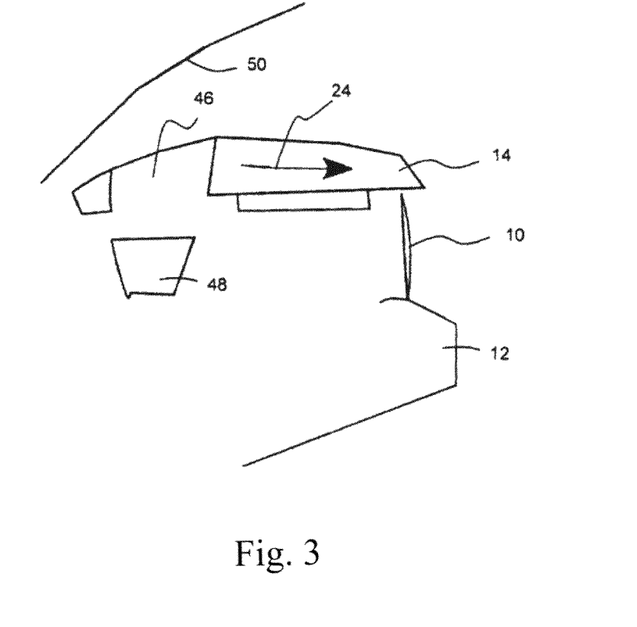
FIG. 3 shows a lateral section through a dashboard assembly having a vehicle arrangement of a second embodiment shown in FIG. 1.

Referring to FIG. 3, when translating the upper part 14 relative to the lower part 12 in the direction of arrow 24 or when pivoting the upper part 14 relative to the lower part 12 in the direction of arrow 40, a free space 46 can be generated within the dashboard assembly 1. This free space 46 can be used for an additional component. For example, a projector 48 for a head-up display can project information through free space 46 onto the windshield 50 or another surface. This information may be the same as that shown on the display area 10, but hidden by moving the upper part 14. The information can be supplementary or redundant.

Instead of or in addition to the upper part 14, the display area 10 can be movable. The shape of the upper part 14 can also be changed, for example it can be at least partially enlarged or unfolded in one direction.

Figure 4:
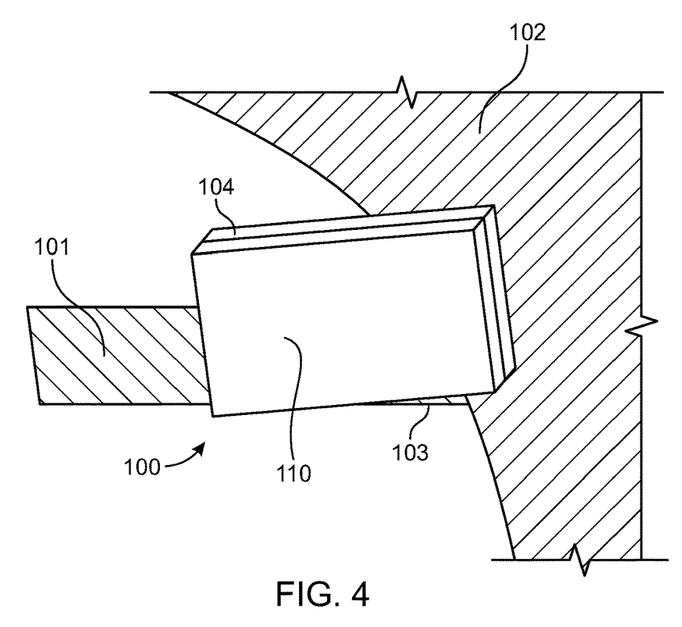
FIG. 4 shows a partial view on a vehicle arrangement of a third embodiment provided by an internal rear view device.

In the embodiment of FIG. 4 the vehicle arrangement comprises a display device 100 in form of an internal rear view device for displaying at least one item of information on a display surface 110 to at least the driver of the vehicle (not shown), with the display device 100 providing a mirror surface arranged on a display support 104. The external rear view device can comprise, in addition to said mirror surface or as an alternative, a camera (not shown), such that on the display surface 110 of the display device 100 the information provided by the camera can be displayed. The display device 100 can be arranged in the field of view as common for side view mirrors, but on the inner side of the door 101 close to the A column 102 of a vehicle body via a base part 103. It is also possible to mount the display device to a dashboard, a roof or anywhere within the vehicle cabin.

In case the display surface 110 is arranged close to a window aerodynamical issues (noise) have to be compensated for. The arrangement behind the window (not shown) provided in the door 101 can lead to whizzing noise, and/or vibrations can occur due to wind impact once the window is opened, as explained in detail with respect to FIGS. 7a to 7d.

Figure 5:
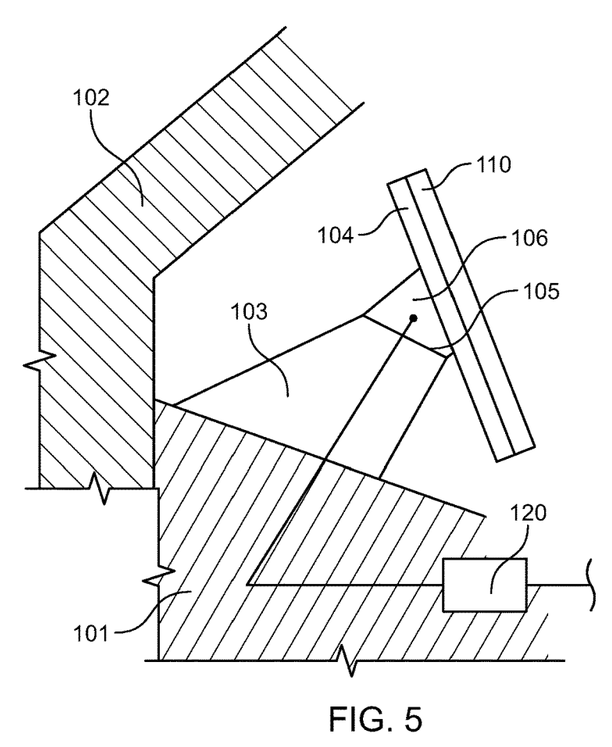
FIG. 5 shows a partial view on a vehicle arrangement of a fourth embodiment provided by another internal rear view device.

In FIG. 5 it is shown that the display device 100 is mounted to the door 101 via the base part 103, with the display support 104 being connected to the base part 103 by a joint 105. The joint 105 allows for the usual movement known for side view mirrors by use of a further component 106 to adjust the position of the display support 104 and, thus, the display surface 110. The further component 106 can for example comprise a glass actuator or piezo electric device or any other adjustment device known for rear view devices and allowing an adjustment in any one of 3 dimensions, preferably horizontally, vertically and rotationally.

Figure 6A:
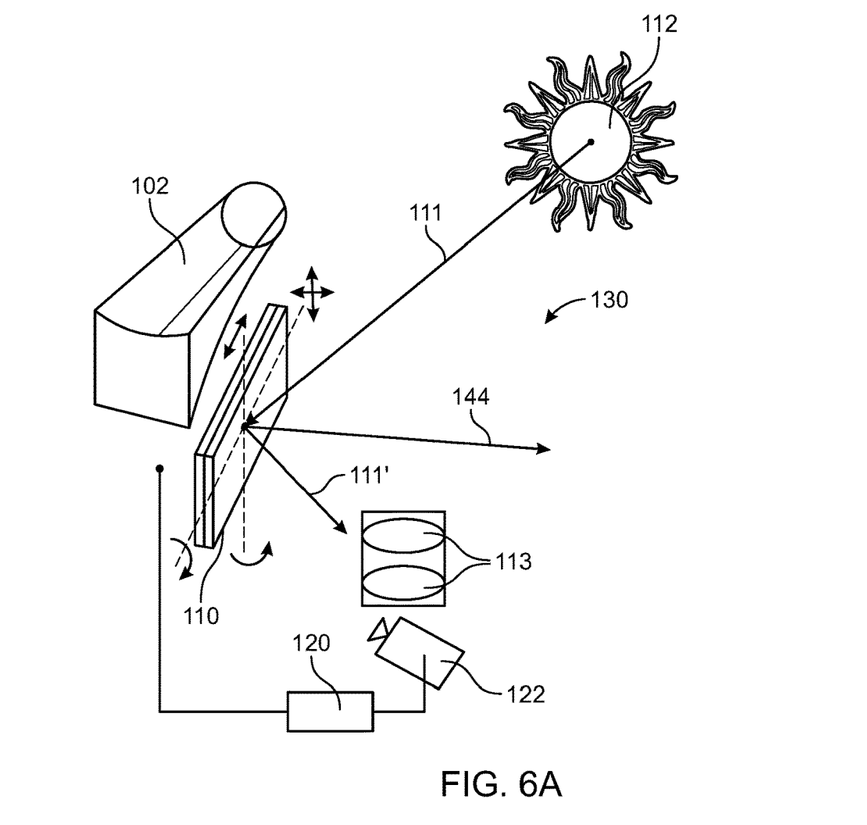
FIGS. 6a and 6b further explain the third embodiment of FIG. 4 in more detail.

FIG. 6a shows a vehicle cabin 130 with a display surface 110 of a display device 100 on the left side, close to the drivers place. The display surface 110 is hit by light beams 111 emitted by a light source such as the sun 112, and said light beams 111 are reflected directly or diffusely by the display surface 110 such that they hit the eyes 113 of the driver as reflected light beams 111'.

In case the display surface 110 gets hit by the light beams 111, the driver can manually adjust the reflection angle by using a button (not shown), which can be integrated in the door or the dashboard, and reposition the display surface 110 via the display support 104. Changing the reflection angle will lead to redirecting the reflected light beams 114 to differ from the reflected light beams 111' and outside the view of the eyes 113.

Further, instead of manually activating the change of the reflection angle, a camera 122 of a detection device for detecting glare of the driver by the display surface 110 can be arranged in the vicinity of a head of the driver of the vehicle such that it detects light beams 111' reflected from the display surface 110. The camera 122 of the detection device connected to a control device 120, and the control device 120 is connected to the further component 106 comprising an actuator for driving a rotation of the reflective surface 110. The camera 122 can be arranged in a driver's seat 123 at the height of the eyes 113 of the driver or provided by eye glasses worn by the driver. As is well known in the art, a control device for driving the further component 106 comprises a non-transitory computer readable medium or computer hardware which operates the control commands.

Figure 6B:
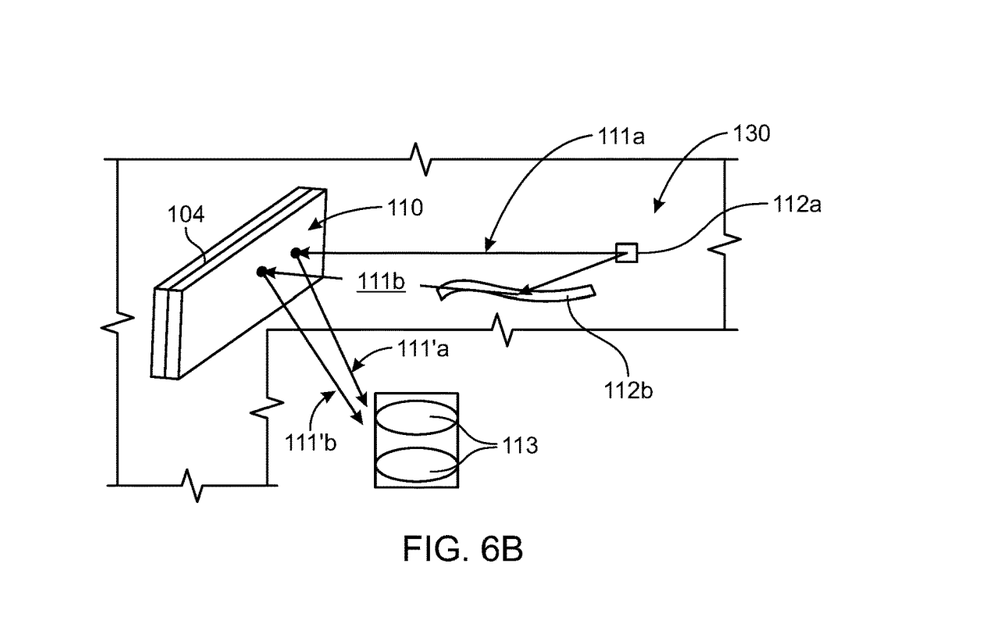

FIG. 6b illustrates that the light beams 111a, 111b impinging on the display surface 110 can originate from another light emitter 112a, differing from the sun, e.g. generated by head lamps of another vehicle (not shown) or a reflector 112b. These light beams 111a, 111b can be reflected into light beams 111a', 111b' disturbing the driver by reaching his/her eyes 113 such that the display surface 110 has to be rotated as described with respect to FIG. 6a.

Figure 7A:
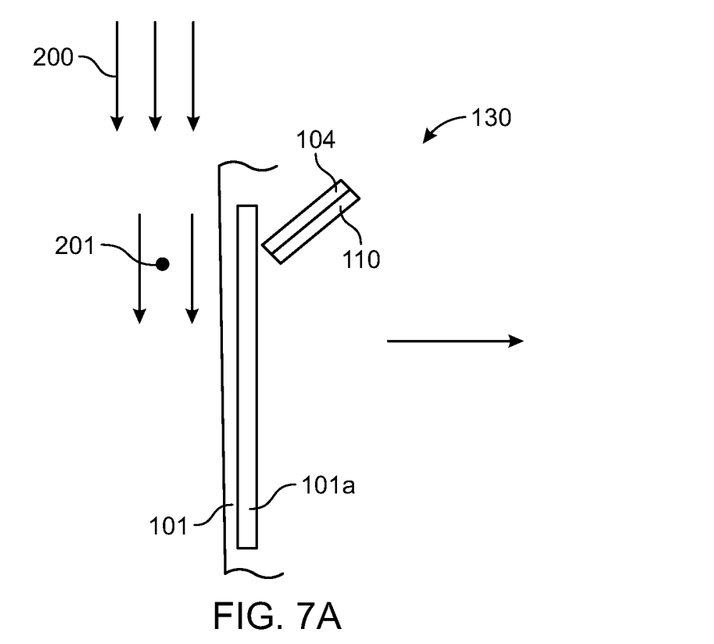
FIGS. 7a, 7b, 7c, and 7d explain a fifth embodiment of a vehicle arrangement.
Figure 7B:
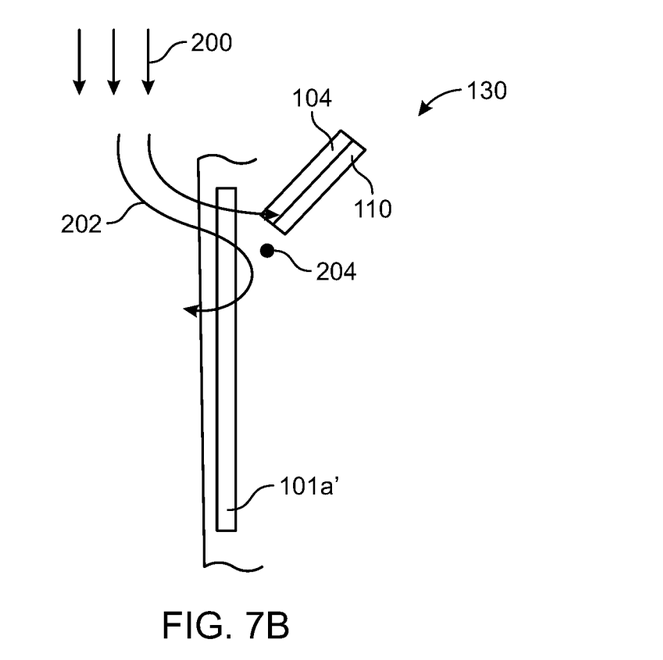
Figure 7C:
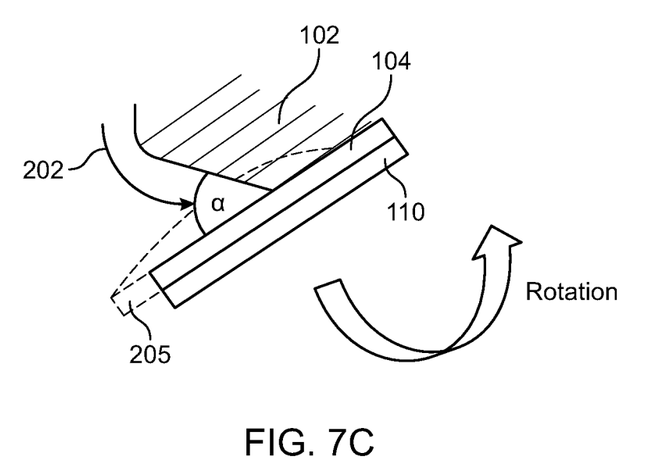
Figure 7D:
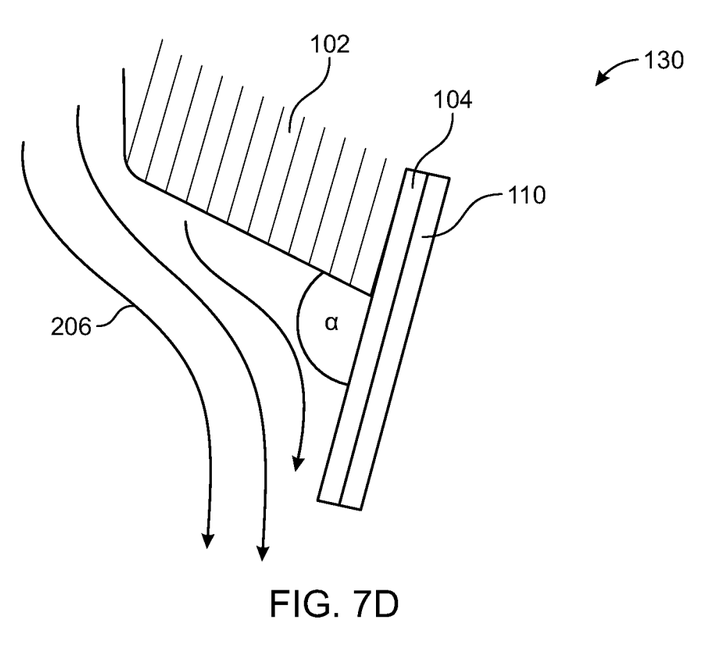

FIGS. 7a to 7d illustrate another disturbance of the driver's view of information provided by the display surface 110, namely resulting from wind impact. In case the display surface 110 is arranged behind the window 101a of the door 101, wind in form of air flow 200 will travel along the window 101a, but outside the cabin 130 as long as the window 101a is closed as shown in FIG. 7a, see air flow 201. But as soon as the window 101a is opened, even only partly, air flow 202 can enter the cabin 130 creating a region of turbulence 204, as shown in FIG. 7b. This can generate a force 205 being applied to the display surface 110, which can even rotate the display device 110 and, thus, lead to a misalignment, see FIG. 7c. This rotation can be compensated by the further component 106, either manually or automatically depending on output of a not shown position sensor. In other words, a rotation of the display surface 110 via the further component 106 can result in smoothing the air flow 206, see FIG. 7d, to ensure the desired field of view.

It is possible to compensate both, a glare as well as a wind stroke, by relative movement between the display surface 110 and the door 101, deployment and/or altering the size or geometry of the further component 106.

Further, it is possible to display the information not only on the display surface 110 of the rear view device but also for example on the display surface 10 of the dashboard assembly 1, or vice versa, as it is not to be expected that light beams reflected by both display surfaces 10, 110 will hit the eyes 113 of the driver. Any other display used in the vehicle can also be used for displaying said information in case of a disturbance of the view. Still further, only part of the information can be displayed at another location, in particular in case of partly screening the display device for avoiding glare such that the screened information part is viewable at said other location.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGN LIST 1 dashboard assembly
10 Display surface of a display device
12 rigid lower part of the dashboard assembly 1
14 movable upper part of the dashboard assembly 1
16 display devices
18 light source (sun)
20 partial area of display area 10 with disturbing reflection
22a first camera
22b second camera
24 direction of movement of part 14
26 electric motor
28 engagement lug
30 U-shaped leg
32 leg-shaped lug
34 guide seat
36 plunger
38 lever arms
40 swivel direction of part 14
42 guide seat
44 guide rod
44a head of the guide rod 44
46 free space
48 projector for head-up display
50 windshield
100 display device (left side of driver)
101 door (left side of driver)
101a window (closed)
101a' window (opened)
102 A pillar (of vehicle body, left side of driver)
103 base part
104 display support
105 joint
106 further component (actuator)
110 display surface
111 light beams
111' reflected light beams
111a light beams
111a' reflected light beams
111b light beams
111b' reflected light beams
112 sun (light source)
112a light emitter
112b light reflector
113 eyes of the driver
114 adjusted light beams
120 control device, control means
121 detection device (camera)
122 camera
123 driver's seat
130 cabin
200 air flow
202 air flow
203 air flow
204 region of turbulence
205 force
206 air flow

What is claimed is:

1. A vehicle arrangement comprising
a display device for displaying at least one item of information on a display surface for at least one person being transported by the vehicle;
a detection device for detecting disturbance of a view of the person of the display surface; and
a further component which is compensating the detected disturbance of the view of the person of the display surface at least partially by at least one of movement relative to the display surface and alteration of its external shape,
wherein the detection device comprises at least one first camera for detecting glare of the person by the display surface,
the at least one first camera is arranged in the vehicle, in the vicinity of a head of a driver of the vehicle, so that it directly detects light beams reflected from the display surface,
wherein the detection device also comprises a wind sensor for detecting disturbance of the view of the person of the display surface from wind or air circulation in the vehicle,
the wind sensor is arranged next to the display surface,
a control device is connected to the detection device for driving the further component for at least one of
projecting beyond or above at least a region of the display surface,
moving or rotating the display surface,
altering a size or geometry of the further component, and
shifting information from the display surface to a second display surface in a way that the person is protected from at least one of a glare by light beams reflected directly or diffusely by the display surface and a disturbance of the display device from wind or air circulation in the vehicle, and
wherein at least one of:
the further component forms at least one section of an upper cover,
the further component can be moved at least partly over the display surface, the movement being at least one of sliding and pivoting, or
the further component comprises at least one of an unrollable blind and foldable visor.

2. The vehicle arrangement according to claim 1, wherein the vehicle arrangement is part of a dash board assembly,
a rear view device, or an internal or an external rear view device,
the display surface is located inside the vehicle, on a door close to an A-column, or
the display surface comprises a mirror surface.

3. The vehicle arrangement according to claim 1, wherein the further component, when moving or changing its outer shape or both, releases a further display device which provides an alternative or additional display for at least part of the information, and the further display device is connected at least to the control device.

4. The vehicle arrangement according to claim 3, wherein the further display device is part of a head-up display.

5. The vehicle arrangement according to claim 1, wherein the display surface is suited to be moved at least one of translationally and rotationally, or the further component comprises at least one actuator or at least one drive device.

6. The vehicle arrangement according to claim 1, wherein the further component comprises at least one compensatory means for compensating at least one of a relative movement and alteration of external shape to display complete information, selected from
a mechanical compensation means,
an electronic compensation means, or
an additional display provided by an additional display device.

7. The vehicle arrangement according to claim 1, wherein
the detection device is suited to detect a direction of gaze of the person,
the detection device comprises at least one of a light sensor, a camera, an infrared camera, an iris recognition device, an eye tracking device and a polarisation filter, behind which at least one light sensor or a camera is arranged,
the detection device comprises a position sensor, or
the detection device comprises a plurality of sensors arranged around the display surface.

8. The vehicle arrangement according to claim 1, wherein
the first camera comprises a polarizing filter,
the first camera is embedded in a driver's seat, or
the first camera is integrated into a mobile device and into wearable eye glasses.

9. The vehicle arrangement according to claim 1, wherein the detection device comprises at least one of a second camera for recording the driver's face and eyes, and at least one of a third camera or light sensor or position sensor arranged next to the display surface.

10. The vehicle arrangement according to claim 1, wherein the detection device receives information on at least one of a position and change of position of the display surface relative to at least one of a dashboard assembly, a windshield, a door, a window, an A pillar and a driver's seat.

11. A vehicle, comprising at least one vehicle arrangement according claim 1, the control device being provided by a vehicle control device.

12. The vehicle according to claim 11, wherein
the vehicle arrangement with its display surface is provided by a rear view device, the rear view device comprising:
a mirror surface and a light sensor or camera,
the vehicle arrangement with its display surface is provided by a dashboard assembly, or
at least two vehicle arrangements with two display surfaces are provided, one display surface being part of a dashboard assembly and another display surface being part of a rear view device.

13. A method for providing a display in or on a vehicle by using a display device with a first display surface, detecting whether at least one person is being transported by the vehicle, is disturbed by at least one of a reflection of light beams from a light source or a reflector on the first display surface or a relative movement of the first display surface due to an impact of wind or air circulation, the method comprising:
detecting a disturbance of the view of a person of the first display surface using a camera and a wind sensor,
wherein the wind sensor is arranged next to the first display surface; and
controlling a further component in case of detection of a disturbance using control means connected to the detection device for at least one of
relative movement between the first display surface and at least one of a dashboard assembly, a windshield, a door, a window, a driver's seat, and the further component,
deployment of the further component,
altering the size or geometry of the further component, and
shifting information from the first display surface to a separate second display surface.

14. The method according to claim 13, wherein the method is performed by a vehicle arrangement.

15. A vehicle arrangement comprising:
a display device for displaying at least one item of information on a display surface for at least one person being transported by the vehicle;
a detection device for detecting disturbance of a view of the person of the display surface,
wherein the detection device comprises a wind sensor for detecting disturbance of the view of the person of the display surface from wind or air circulation,
wherein the wind sensor is arranged next to the display surface; and
a component which is compensating the detected disturbance of the view of the person of the display surface at least partially by at least one of movement relative to the display surface and alteration of its external shape,
wherein the component, when moving or changing its outer shape or both, releases a further display device which provides an alternative or additional display for at least part of the information, and the further display device is connected at least to a control device.

16. A vehicle arrangement comprising
a display device for displaying at least one item of information on a display surface for at least one person being transported by the vehicle;
a detection device for detecting disturbance of a view of the person of the display surface; and
a further component which is compensating the detected disturbance of the view of the person of the display surface at least partially by at least one of movement relative to the display surface and alteration of its external shape,
wherein the detection device comprises at least one first camera for detecting glare of the person by the display surface,
the at least one first camera is arranged in the vehicle, in the vicinity of a head of a driver of the vehicle, so that it directly detects light beams reflected from the display surface,
wherein the detection device also comprises a sensor arranged next to the display surface,
wherein the sensor is at least one of a wind sensor and an air circulation sensor,
a control device is connected to the detection device for driving the further component for at least one of
projecting beyond or above at least a region of the display surface, and
moving or rotating the display surface,
in a way that the person is protected from glare by light beams reflected directly or diffusely by the display surface, and
wherein at least one of:
the further component forms at least one section of an upper cover,
the further component can be moved at least partly over the display surface, the movement being at least one of sliding and pivoting, or the further component comprises at least one of an unrollable blind and foldable visor.

\* \* \* \* \*